United States Patent [19]
Gray

[11] Patent Number: 6,049,353
[45] Date of Patent: Apr. 11, 2000

[54] COMPUTER NETWORK, PROCESSING OF DIGITIZED, COMPRESSED, SECURITY CAMERA VIDEO, INTELLIGENTLY ONTO HARD DRIVES OF PERSONAL COMPUTERS

[76] Inventor: Darrell D. Gray, 209 Meadow Woods Dr., Kyle, Tex. 78640-8832

[21] Appl. No.: 08/941,787

[22] Filed: Sep. 30, 1997

Related U.S. Application Data

[63] Continuation-in-part of application No. 08/649,494, May 17, 1996, abandoned.

[51] Int. Cl.⁷ ..................................................... H04N 7/18
[52] U.S. Cl. ...................... 348/159; 348/169; 340/825.06
[58] Field of Search .............................. 348/96, 152, 153, 348/143, 159, 154, 135, 137, 169, 2, 407, 180; 395/200.61, 200.77, 200.41; 340/825.06, 825.31

[56] References Cited

U.S. PATENT DOCUMENTS

| | | | |
|---|---|---|---|
| 5,202,759 | 4/1993 | Laycock | 348/152 |
| 5,509,009 | 4/1996 | Laycock et al. | 348/14 |
| 5,828,848 | 10/1998 | MacCormack et al. | 348/407 |
| 5,854,902 | 12/1998 | Wilson et al. | 348/180 |
| 5,862,342 | 1/1999 | Winter et al. | 395/200.61 |
| 5,909,548 | 6/1999 | Klein et al. | 348/135 |

*Primary Examiner*—Tommy P. Chin
*Assistant Examiner*—Gims Philippe

[57] ABSTRACT

An apparatus and method encodes alarm condition data and other data into the vertical interval signals of a plurality security television cameras so that the data may be used to determine which security camera pictures should be stored and retrieved. Television pictures including time and camera identification data are stored in digital format on the disk drive of a computer system. Pictures from multiple security cameras are selectively stored, even though the vertical interval signals of the various cameras are in general not synchronized with respect to one another. The contents of registers where the data is stored are updated field by field. The register updating operation is performed only during vertical intervals associated with each camera. Stored pictures and data are selected and retrieved from a data base according to predetermined criteria.

4 Claims, 7 Drawing Sheets

COMPUTER NETWORK, PROCESSING OF DIGITIZED, COMPRESSED, SECURITY CAMERA VIDEO, INTELLIGENTLY ONTO HARD DRIVES OF PERSONAL COMPUTERS

CLAIM FOR PRIORITY

This continuation-in-part application claims the benefit of the filing date of that certain utility patent application filed May 17, 1996 under Ser. No. 08/649,494, titled "Computer Network Processing of Digitized, Compresses, Security Camera Video Intelligently Onto Hard Drives of Personal Computers," now abandoned.

BACKGROUND

The present invention relates to methods and apparatus for encoding data into the vertical interval signals of a plurality of security television cameras so that the data may be used to intelligently determine which security camera pictures should be stored, and possibly retrieved. In the preferred embodiment of the invention, the pictures are stored in digital format on the disk drive of a computer system. The invention includes methods and apparatus for storing data from multiple security cameras, even though the vertical interval signals of the various cameras are in general not synchronized with respect to one another. In general, data inserted into the vertical interval signals will change field-by-field, so that the contents of registers where the data is stored must also be updated field by field. To avoid conflicts, the register updating operation must be performed only during vertical intervals associated with each camera.

This problem is solved in the preferred embodiment. Data to be inserted into the vertical interval signals of one or more television cameras is digitally phase controlled and locked to a particular horizontal line occurring after the start of vertical synchronization and read by a similar digitally phase controlled receiver locked to the same horizontal line.

The horizontal scan lines occurring within the vertical interval signals of television systems are increasingly used to transmit various kinds of data. For example, teletext and captioning for the deaf is usually transmitted on selected horizontal lines which occur during the vertical interval of a broadcast television signal. Also, the vertical interval signals of a scrambled television signal can be used to transmit appropriate instructions for enabling an authorized receiver to unscramble the signal.

In a typical security television system, signals from several television cameras are routed by cable or other means to some central location where they may be viewed and recorded on video tape. Scenes from different cameras are typically sequenced or multiplexed into one video signal for recording. This technique provides a still picture about once every four seconds for a single camera, and once every 40 seconds for ten cameras, and so forth. Time lapse video recorders can record ten to twenty days of such information on a single tape.

Since security television cameras typically monitor doors, hallways, and loading docks, hours, days and even months of the same scene will be recorded by existing systems. It will then require hours, days or even months to review all of the scenes recorded for a given location to locate the record of an intruder or other security-related event. Once the investigator notes suspicious activity, he must somehow identify the exact location of the scene on the tape in order to rapidly find it again. This may be crucial if the picture is used in a criminal prosecution. Typical security video tapes may have 50 to 100 scenes scattered throughout the tape. The time window for suspected activity may cover several tapes. If cameras feeding the recorder are located in different cities or states, the identification problem becomes practically impossible to solve.

The multiplexing of data onto television signals is known in the art. For example, U.S. Pat. No. 5,508,736 by Cooper, describes a system which combines television camera video and data from sensors at the camera location, and which transmits the composite signal to a recording device at another location. However, Cooper does not resolve the problem of receiving and storing data encoded into the video signals of a plurality of cameras, particularly cameras which are sending data asynchronously with each other. Also, Cooper does not provide a means to transmit data from the recording device to the camera location to respond to conditions signaled by the received data.

U.S. Pat. No. 4,831,438 by Bellman Jr., et al., discloses the transmission of data multiplexed with video signals from a plurality of cameras and sensors to another location for display and recording. However, Bellman, Jr., et al. use microwave and VHF radio as the transmissions means, and they encode data by generating a base band video signal and audio subcarriers instead of inserting the data into unused horizontal lines in the vertical interval. Bellman, Jr., et al. also disclose the reverse transmission of command signals from the receiving end into the camera and sensor elements. However, they do not address the problem of receiving and storing data sent asynchronously by remote cameras and sensors, nor do they provide for automatic detection of alarm conditions, the automatic storage of pictures and data responsive to alarm conditions, or the selective retrieval of stored pictures.

Accordingly, I intend my invention to provide an improved method for encoding data into the vertical interval of a plurality of security television cameras such that the data may be utilized to intelligently determine which pictures should be stored, and further, for storing selected pictures in a digital format in a computer system.

Another object of my invention is to build a system that will allow security systems to respond to the detection of suspicious activity, such as by moving the view of a camera or turning on lights. An embodiment of my invention accomplishes this by reverse transmitting control signals to the security camera locations during the vertical interval.

Another object of the invention is to build a security system which will allow viewing and control of remote sites thought a computer network. Such a network may be local to the secured location, but it may generally be any computer network, even the Internet Another object of the invention is to build a security system in which stored video pictures have date and time stamps, the accuracy of which is unimpeachable. This is accomplished by storing the date and time stamped video pictures in a database which is password protected. This goal is further accomplished by only allowing network connections to the computer where video pictures are stored if such remote systems have the same software as the computer where the pictures are stored. This prevents persons connecting to the network from remote locations from modifying the original picture if they do not have authorization to enter the database in which the pictures are stored.

Many modern security cameras have connections for additional sensors, such as sensors which detect door openings, motion, invalid access cards, and other anomalies. Another object of my invention is to take advantage of such camera features by sending commands to a remote camera to acquire additional information in response to signals from such sensors, such as by moving its view to a particular door, and then storing the acquired pictures as described above. All of this may be done by transmitting such commands during the vertical interval signals, while at the same time receiving and storing pictures from the same scene. A computer system used with my invention could also activate an alarm or call the police.

SUMMARY OF THE INVENTION

I disclose an apparatus for selecting, storing and retrieving television camera video pictures generated asynchronously from one or more television cameras. The apparatus comprises at least one encoder, and each encoder is connected to a television camera for encoding alarm condition and camera identification data into the video picture vertical interval signals generated by the respective cameras. The encoders further include a first timing means for causing the encoding of alarm condition and camera identification data to take place in phase with respective predetermined horizontal lines of the video picture vertical interval signal of each camera.

I provide a means for transmitting the video pictures and data encoded therein to a processor, which further comprises at least one decoder. Each decoder is responsive to signals from one camera, and decodes the data encoded in the video picture vertical interval signals of the respective cameras into a parallel format.

A plurality of data registers is connected to each decoder for storing data received from the decoder. My invention provides a timing means for updating the contents of the data registers, so that the register update operation takes place in phase with the writing and reading of data to the predetermined horizontal lines. A data bus is connected to the data registers, and a computer is connected to the data bus. The processor further includes a switching means for selecting a video picture and data encoded therein from video pictures transmitted from a plurality of cameras, responsive to commands from the computer, and a means for transmitting selected video pictures and data encoded therein from the switching means to the computer.

The computer further comprises a means for reading and writing data from selected data registers connected to the data bus, a software means for detecting the occurrence of pre-determined conditions originating at one or more of the cameras, a software means for selecting video pictures to digitize and store, responsive to the occurrence of pre-determined conditions originating at one or more of the cameras, a software means for generating commands for the switching means, a means for digitizing selected video pictures, a means for storing selected video pictures in a database, and a means for selectively retrieving and displaying stored video pictures from the database. Date and time information may be added to the selected pictures by the computer.

I also disclose a method of selecting, storing, and retrieving video pictures generated asynchronously from one or more television cameras. The method includes the steps of encoding camera identification data and alarm condition data into the vertical interval signals of the video pictures of one or more television cameras; with the encoding further including the first timing step of encoding camera identification data and alarm condition data so that the encoding takes place in phase with respective pre-determined horizontal lines of the video picture vertical interval signal of each camera, then transmitting the video pictures having encoded data to a processor.

In the processor the encoded data from each camera is decoded and placed into data registers connected to a data bus The decoding further includes the second timing step the updating of the data registers so that the register update operation takes place in phase with the writing and reading of data to the pre-determined horizontal lines. The data bus is polled to read the data placed thereon.

A software means determines which of a plurality of video pictures having encoded data to digitize and store according to predetermined criteria; selecting the video pictures having encoded data from one of the cameras to digitize and store; digitizing and storing the selected video pictures having encoded data in a database; and selectively retrieving stored video pictures having encoded data from the database. Date and time information may be added to the picture by the computer.

DESCRIPTION

Figure 1:
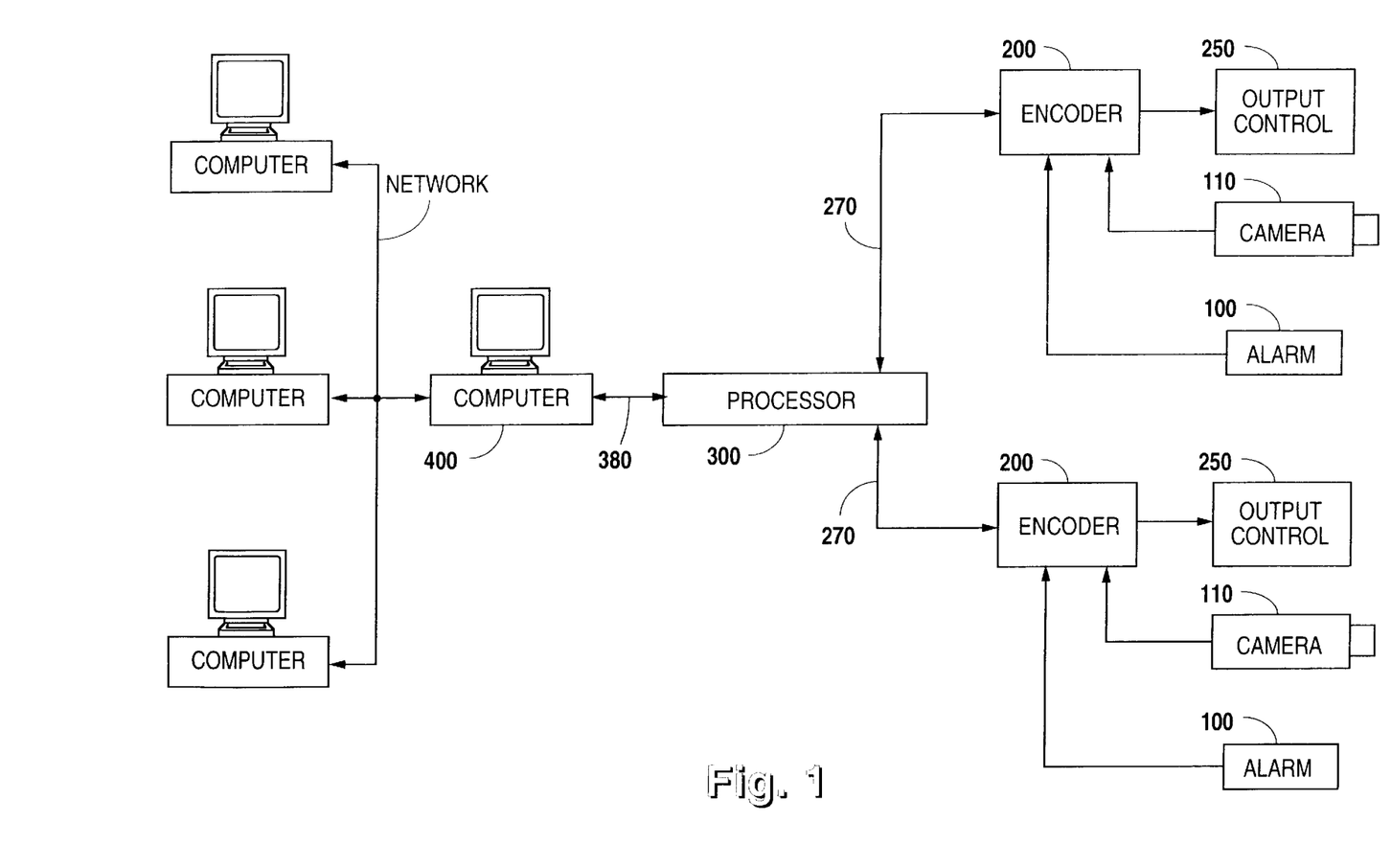
FIG. 1 shows an overall block diagram of the preferred embodiment of the invention, showing two camera and sensor units connected to the processor.

FIG. 1 shows the general architecture of the preferred embodiment. A plurality of television cameras 110 are each connected to an encoder 200. The encoder 200 is also connected to a sensor 100 or other monitoring device. Modern security television cameras generally have connections for attachment to sensors which change state depending on a particular alarm condition. For example a sensor 100 may be a magnetic door switch, an access control alarm (responsive to conditions such as a void access card or invalid access time), a medical alarm in a hospital, traffic monitoring systems, shoplifting alarms, or tampering detection devices at power stations or industrial plants. Such sensors 100 typically operate by contact closure. A security camera 110 attached to such sensors 100 typically has a connector for conductors which can transmit several detected alarm conditions to some other location.

As shown in FIG. 1, the video and alarm condition signals from the camera 110 are connected to an encoder 200. An alarm condition detected by a sensor 100 is encoded into the vertical interval signal of the camera 110, preferably along with an identifying code for the camera 110. The signal is transmitted to a processor 300 at some remote location by coaxial cable, microwave radio, or some other conventional transmission means 270. The processor 300 decodes the alarm conditions and camera identifications presented to it and places these signals on a data bus 380 connected to a computer 400. The computer executes software which polls the data bus 380 for information pertaining to a plurality of cameras 110. The computer 400 selects particular camera video signals according to predetermined criteria, such as a combination of an alarm condition with a time of day, and digitizes and stores these signals. The software allows the operator of the system to view all pictures received from connected cameras, and to store some or all of the pictures from particular cameras 110. In one embodiment of the invention, the computer 400 can also transmit signals on the data bus 380 to the processor 300. These reverse transmitted signals are encoded by the processor 300 and transmitted to the encoder 200 attached to the selected camera 110. These signals may be used to move the camera 110, turn lights on or off, sound alarms, lock doors, or take other actions, depending on the sensors 100 or other devices attached to the camera.

The computer 400 may be part of a network of computers. Some computers on the network may be physically located anywhere in the world, but all connected computers can receive pictures and alarm conditions from the computer 400 connected to the processor. Depending on software settings, such remote computers can also transmit data or instructions to cameras and sensors.

Figure 2:
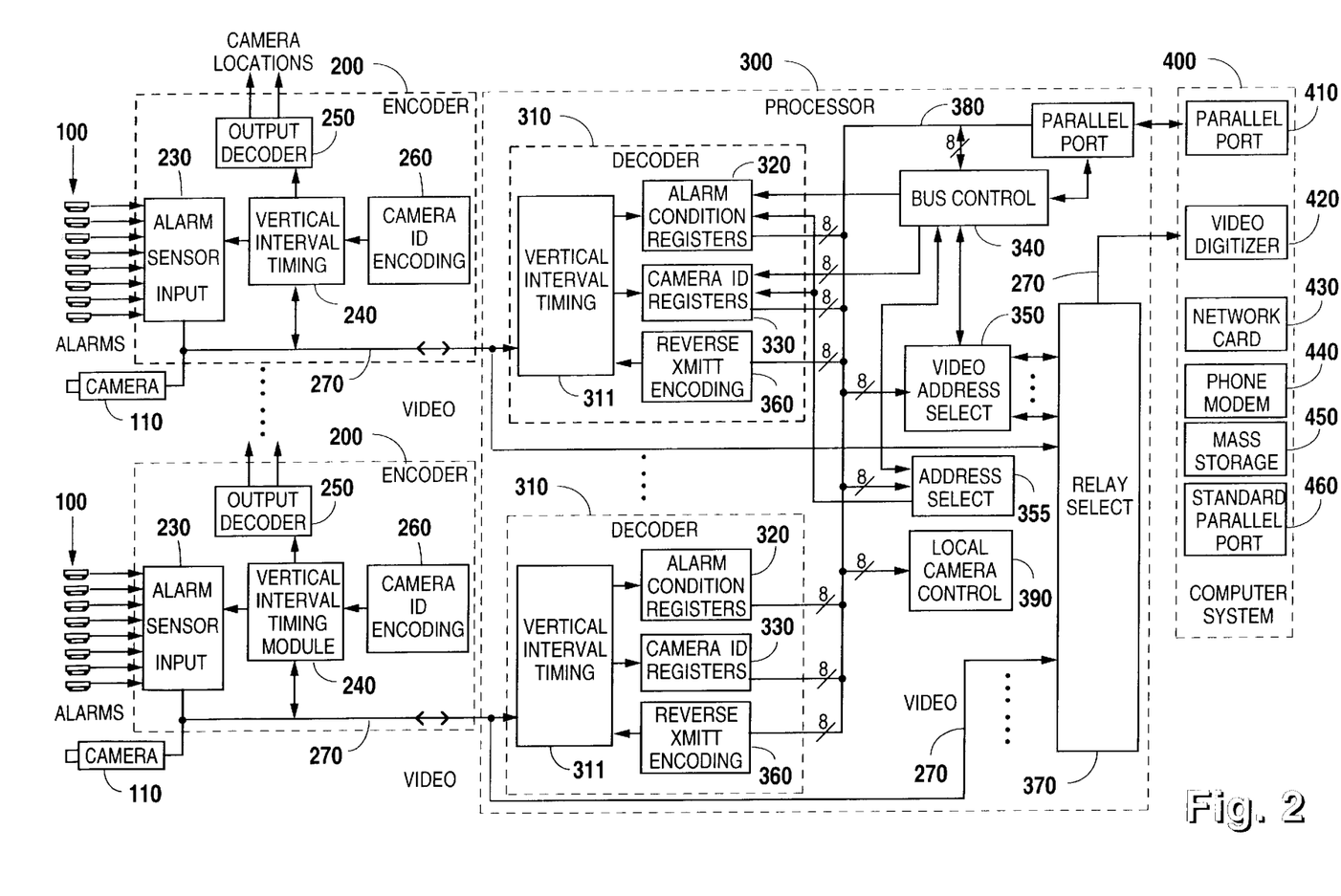
FIG. 2 shows a system block diagram of the preferred embodiment of the invention.

FIG. 2 is a more detailed block diagram of the preferred embodiment of the invention. In a typical installation there will be a plurality of camera locations. Each camera location includes a camera 110, a plurality of sensors 100 connected to the camera 110, and a means 230 for encoding switch closures in the sensors 100 into a binary word. Similarly, a means 260 for encoding a number to identify a particular camera 110 into a binary word is provided. The latter two means 230 and 260 are shown in more detail in FIGS. 3 and 4.

Figure 3:
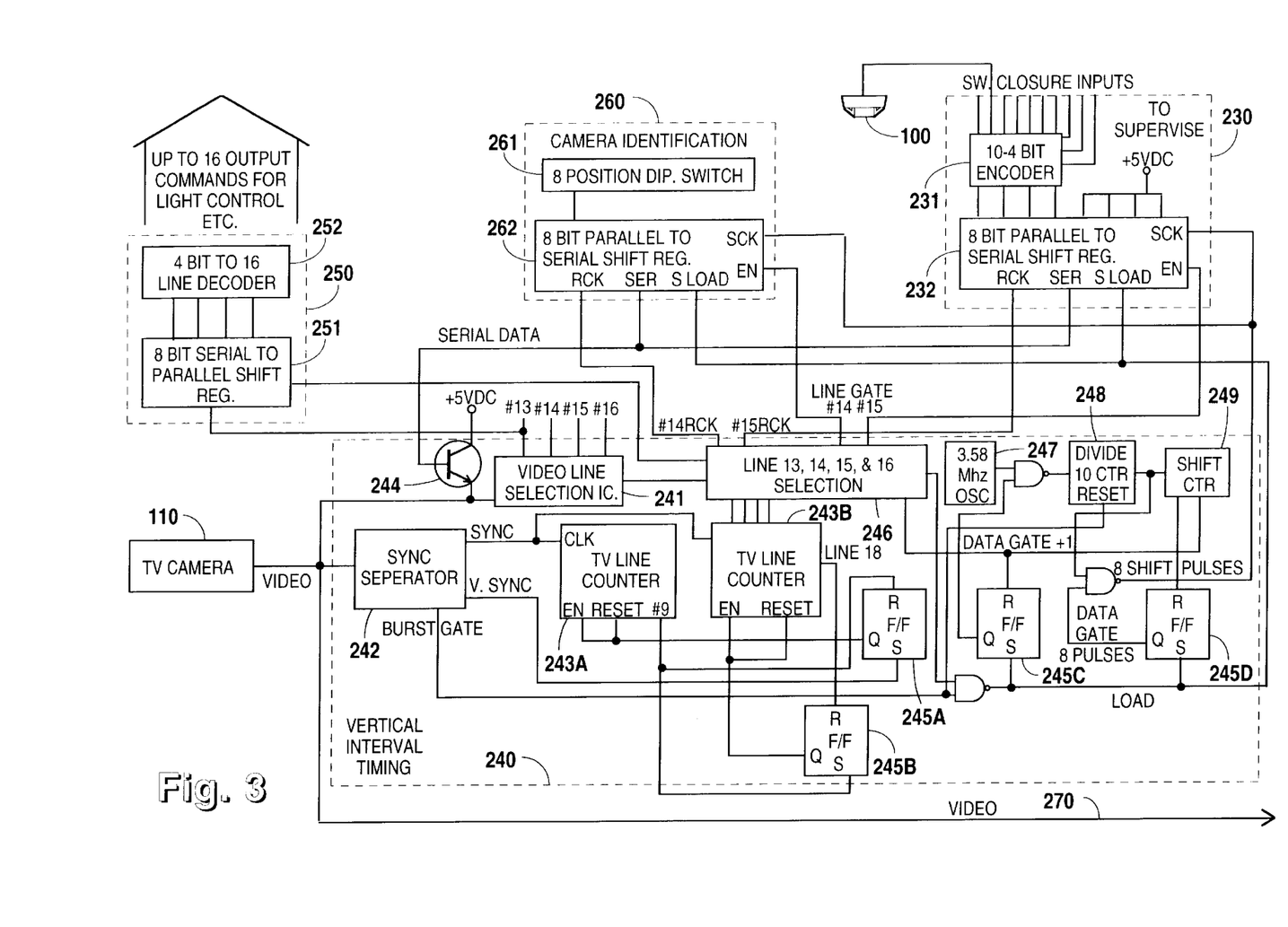
FIG. 3 shows a system block diagram of the encoder used in the preferred embodiment.

In FIG. 3, the camera identification is set by a DIP switch 261 and the switch positions are converted to a binary word by a conventional parallel to serial shift register 262, such as the type 74HC589. Up to ten alarm sensors 100 in the preferred embodiment are encoded into a four-bit parallel word by a parallel encoder 231 such as the type 74147. This binary word is converted to a serial word by a parallel to serial shift register 232, such as the type 74HC589.

Each camera location optionally has an output module 250 which is connected to the video signal transmission means 270. As explained below, in another embodiment of the invention, this output module 250 reads data transmitted from the computer 400 in the vertical interval signal and uses this data to control the camera 110, control sensors 100, or control other actions such as turning on lights or locking doors.

Figure 4:
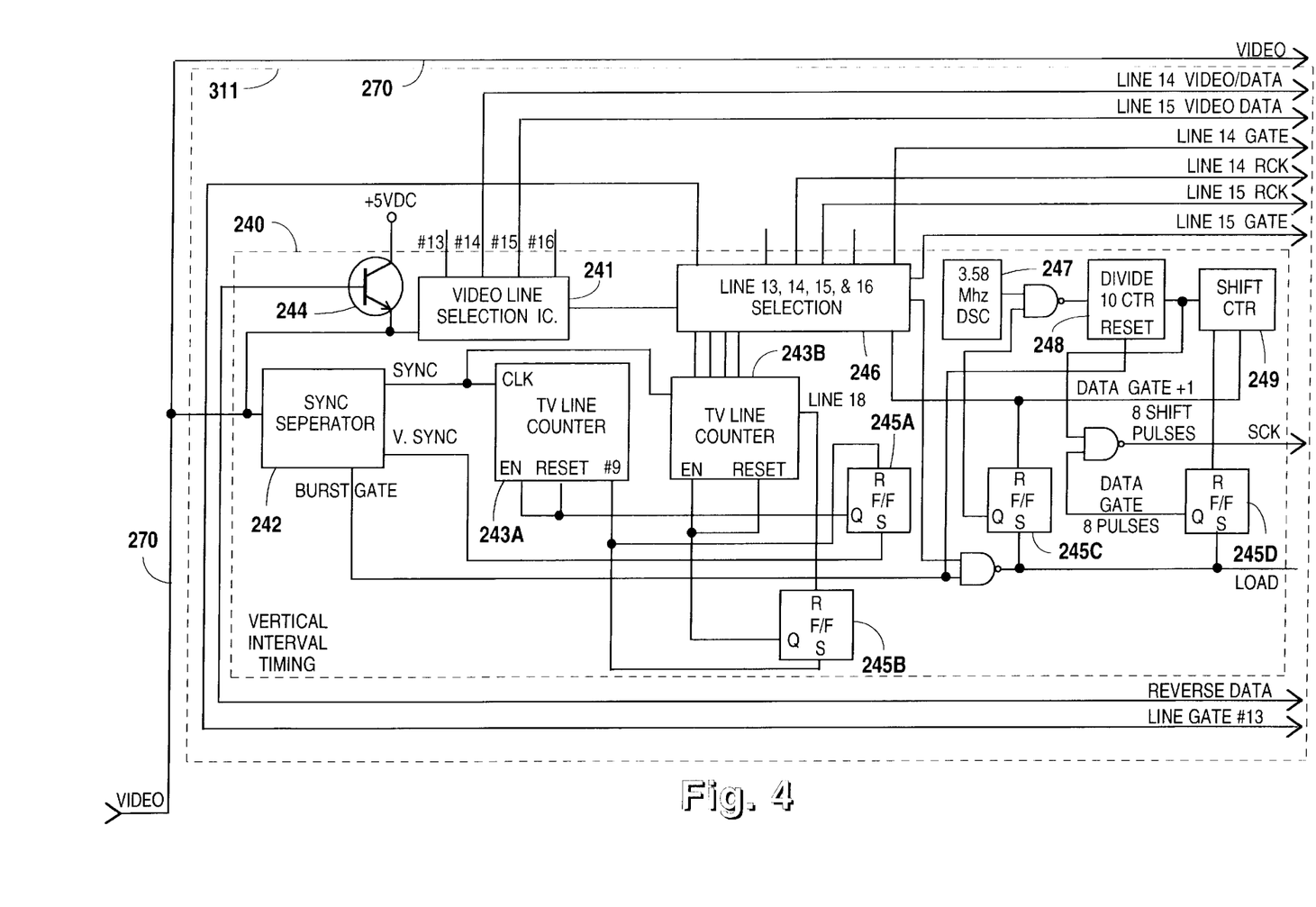
FIG. 4 shows a system block diagram of the decoder used in the preferred embodiment.

The encoder 200 encodes the camera identification and the status of the alarm sensors 100 into the video signal from the camera 110. This video signal is transmitted by any conventional means 270, such as coaxial cable, to a remote location, called for convenience "the monitoring area." All video signals are connected to a processor 300 in the monitoring area. As shown in FIG. 2, each processor 300 contains a plurality of decoders 310 each corresponding to video input from a particular camera location. FIG. 4 shows the block diagram of the decoder 310 in more detail. The video signal is received by a second vertical interval timing module 311 similar to the first vertical internal timing module 240 in the camera location. The vertical interval timing module 311 decodes the serial data imposed on the video lines in the vertical interval as explained below. The decoded data from the video signal is loaded into alarm and camera identification interfaces 320 and 330 whose outputs are connected to a data bus 380, which in the preferred embodiment is an eight-bit parallel bus intended to be read by the computer 400 using the IEEE 1284 parallel port standard. The video signal from each camera 110 also passes to a switching means 370, from which a particular signal is selected for transmission to a video digitizer 420 in the computer 400. Video from a particular camera is selected in the preferred embodiment by a one-of-sixteen decoder 350, which is controlled from the data bus 380 by the IEEE 1284 control module 340.

Control signals from the computer 400 to the camera location may also be placed on the data bus 380. Such control signals are imposed on the appropriate line within the vertical interval by parallel encoder 360, and thus made available to the parallel output module 250 at the camera location.

In order for the system to capture and hold data from a plurality of cameras whose pictures arrive randomly with respect to one another, it is necessary to provide some timing means so that the encoding and decoding of data takes place on the same horizontal line in the same vertical interval for each camera. In the preferred embodiment, a first timing means is provided by the first vertical interval timing module 240 in the encoder 200, and a second timing means by the second vertical interval timing module 311 in the decoder 310. These two vertical interval timing modules 240 and 311 are essentially the same circuit, but in the encoder 200 the first vertical interval timing module 240 encodes alarm conditions and camera identification into the vertical interval signal of the camera 110, while in the decoder 310, the second vertical interval timing module 311 decodes the data from the vertical interval signal and converts it to serial data which is then further processed and placed on the data bus 380. FIG. 4 shows the second vertical interval timing module 311 in the decoder 310. Essentially, the vertical interval timing module in either function strips sync information from the composite video input and provides the timing necessary to select specific horizontal lines within the video vertical interval. The vertical interval timing module also generates all the timing signals necessary to insert data into the vertical interval signal or read data from the vertical interval signal. The action of the first vertical interval timing module 240 in the encoder 200 is described first.

The sync separator 242 is preferably an LM1881 video sync separator manufactured by National Semiconductor. As shown in FIG. 3, the separated horizontal sync signal is transmitted to a first counter 243A to count the number of lines that occur after vertical sync begins. The counter 243A is gated by a bistable latch 245A which triggers counting at the beginning of vertical sync and resets it after the counting of line 9. The ninth count is provided as one of the outputs; this count sets the bistable latch 245A. A second counter 243B is identical to the first counter 243A. The second counter 243B counts lines 11 through 18 of the vertical interval. It is reset by a second latch 245B which is set by the line 9 count of the first counter 243A. The line 18 count from the second counter 243B is used to reset the first latch 245A, as shown in FIG. 3. The counters 243A and 243B, are preferably type 4017B decade counters.

The analog switch 241 selects the particular video line from the composite video signal when commanded by the output of a second analog switch 246, which receives the vertical interval timing signal as a high logic level from the line counter 243B and uses this signal to switch inputs from encoding means 230 and 260 for alarm sensor inputs 233 in camera identification data. Output from the second switch 246 enables the shift registers 232 and 262 in the encoding means 260 and 230, and clocks the registers of the shift registers 232 and 262 successively so that encoded data from the encoding means 260 and 230 is placed on the base of a switching transistor 244. The emitter of the transistor 244 is connected to the incoming video signal, and the video signal is modulated by the serial data as the transistor 244 is switched.

Further included in the first and second timing means is a means to provide phase lock between the data ultimately clocked into the first and second data registers 322 and 332, in the decoder 310 and the horizontal line timing of the video signal. This is accomplished as shown in FIGS. 3 by using the burst gate signal generated by the sync separator 242 to delay either the reading or writing of the data to a predetermined horizontal line past the color burst that is present on the predetermined horizontal lines. The burst gate signal is used to reset a third counter 248 such that the first shift pulse applied to the shift registers 232 and 262 will always occur 10 counts after the end of the burst gate and then at every 10th count of a 3.58 MHz oscillator 247 for each succeeding shift pulse. Preferably, the third counter is a type 4017B. The 3.58 MHz signal is only applied to the counter 248 during the desired line time of the vertical interval signal. Thus the data shifted out of the shift registers 232 and 262 in the encoding means 230 and 260 is phase locked to horizontal line timing of the particular video signal. A fourth counter 249 counts the 8 shift pulses needed to shift data out of the shift registers 232 and 262.

The same timing means is used in the decoder 310 to phase lock the updating of the data registers 322 and 332 with the predetermined horizontal line into which data has been encoded by the encoder 200. The second vertical interval timing module 311 is identical to the first vertical interval timing module 240, with the three exceptions. First, the incoming video signal is not modulated by a transistor 244 as in the first vertical interval timing module 311. Second, the output lines of the first and second analog switches 241 and 246 are connected to an alarm condition bus interface 320 and a camera identification bus interface 330 (described below) which present decoded data to the data bus 380. Third, the output of the fourth counter 249 is used to clock data into shift registers in the bus interfaces 320 and 330. The second vertical timing interval module 311 thus effectively decodes the data simultaneously impressed upon selected horizontal lines in the vertical interval signal, and impresses this data on the data bus 380 to be read by the computer 400.

Figure 5:
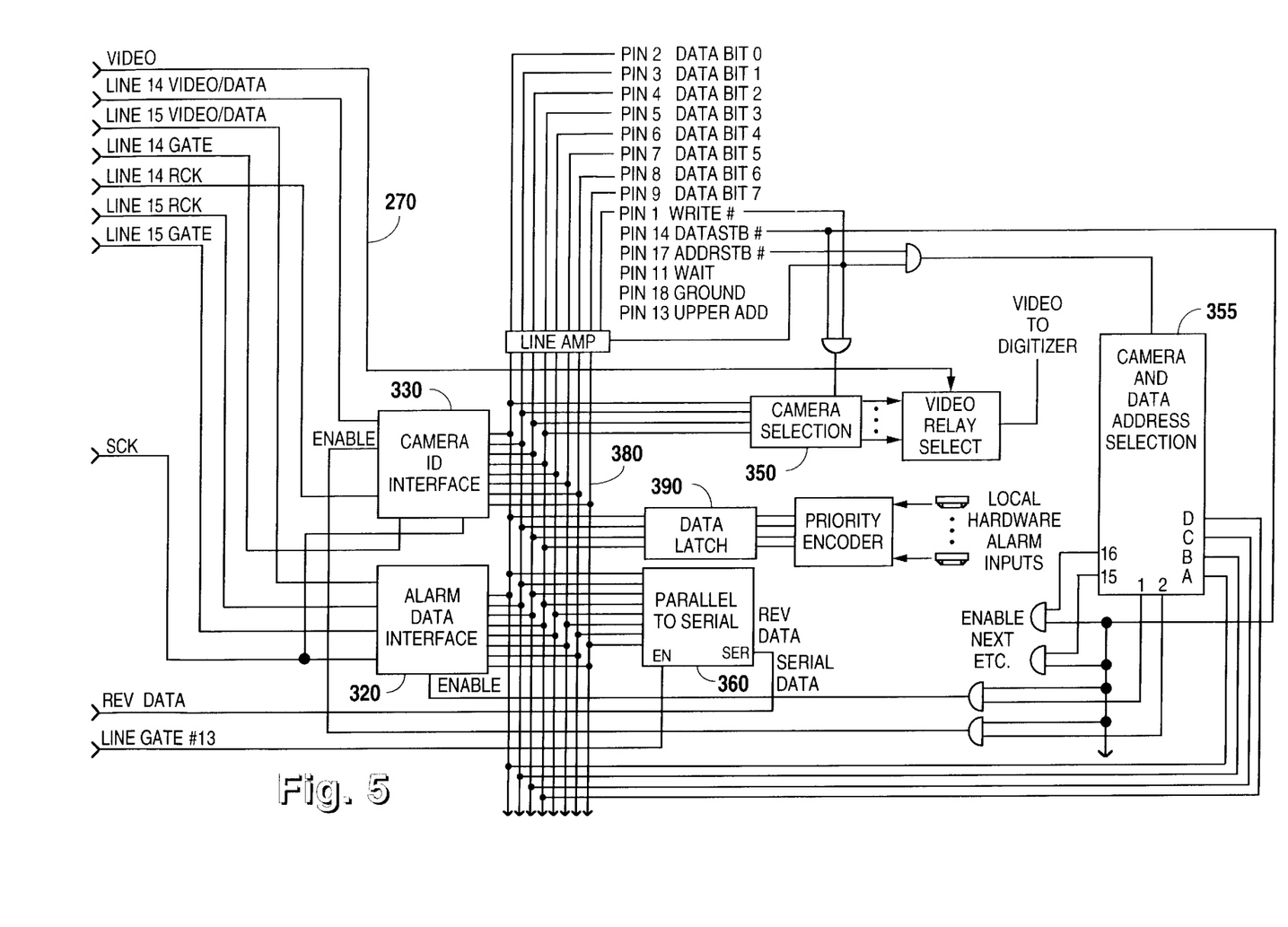
FIG. 5 shows a system block diagram of the connections of the decoder to the data bus.
Figure 6:
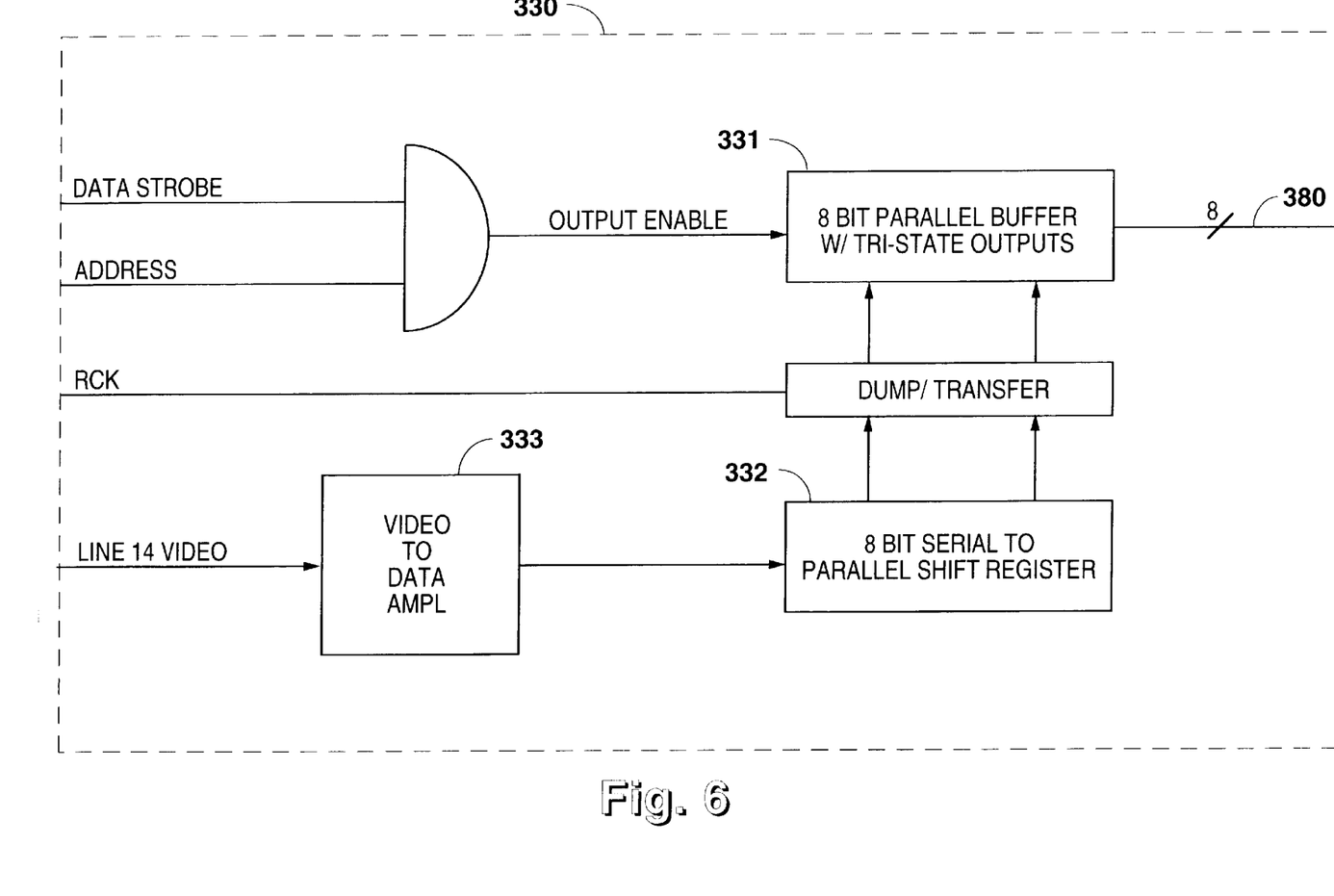
FIG. 6 shows a system block diagram of a typical bus interface.

Within the decoder 310 the second vertical interval timing module 311 as shown in FIG. 4 receives video during the period of its assigned horizontal line within the vertical interval. In the preferred embodiment, line 15 contains alarm data, line 14 contains the camera identification and lines 13 or 16 could be used for reverse transmission of data. Other horizontal lines within the vertical interval could also be used. FIG. 5 continues signal lines from the vertical interval timing module 311 to the bus interfaces 320 and 330. FIG. 6 shows in more detail the camera identification bus interface 330. In each interface data on the horizontal line is shifted from its approximately 1 volt video level to a CMOS compatible 5 volt level by means of a conventional comparator circuit 333. As shown in FIG. 6, data on line 14 containing camera identification data is provided to the serial input of a shift register 332 and shifted into the shift register 332 by the phase-locked pulses from the second vertical interval timing module 311. The parallel output of the shift register 332 holds the data until it is updated one vertical interval signal later, or 1/60 of a second in the NTSC system. The data stored in the shift register 332 is transferred to the buffer 331 by the RCK pulses from the vertical interval timing module 311. The preferred embodimen actually uses a type 74HC595 combination shift register and parallel buffer with tri-state outputs, although separate devices could be used. When the data bus 380 is polled by the computer, this data may be read. A particular decoder 310 is selected by the computer 400, and activated by the output enable logic in the IEEE 1284 control module 340. The parallel buffer 331 has tri-state outputs, so its data is not presented to the data bus 380 until it is enabled by the control module 340. Similarly, alarm condition data encoded on line 15 is shifted into alarm condition bus interface 320, updated, held and read, as just described for the camera identification bus interface 330.

Reverse transmission of data from the computer to a remote camera location can also be accomplished. If this feature is implemented, a parallel encoder 360 latches data from the data bus 380 into a buffer and sends the latched data to vertical interval timing module 311 to be encoded into the appropriate horizontal line within the vertical interval. In this case, the vertical interval timing module will have a transistor switch connected to its video input, as shown in FIG. 3. Within the encoder 200 at the camera location, this data is clocked into a serial to parallel shift register 251 after being switched to the shift register 251 by the first analog switch 241, during the appropriate line in the vertical interval. The shift register 251 is preferably a type 74HC595. Parallel outputs from the shift register 251 are connected to a decoder chip 252, such as the type CD4514. The decoder chip 252 provides separate output lines for commands to control devices at or near the camera location. A typical use would be a command to turn on a light, lock a door, or turn a camera to a pre-determined location. In the preferred embodiment, 16 output lines are provided by the decoder chip 252 from 4 bits of parallel data presented by the serial to parallel shift register 251. The reader will see that more command output lines could be provided by adding another decoder chip, allowing for up to 256 output lines for an 8-bit data bus 380.

The processor 300 contains one each of the decoders 310 and its components described above for each camera and alarm encoder 200 connected to the processor 300. In the preferred embodiment, the processor 300 can receive up to 16 such inputs, but the reader will see that a processor having a larger number of inputs can be easily built by multiplying the basic components just described.

In the preferred embodiment, each processor 300 also contains an IEEE 1284 control module 340, a switching means 370 for switching a plurality of input video signals into one output signal, and a parallel port module 360 for the data bus 380. These modules will now be described in more detail. FIG. 5 shows the connection of these means to the data bus.

The bus control module 340 contains the logic necessary to communicate with the other modules. Other bus communication standards could be used, but the IEEE 1284 standard is used in the preferred embodiment because it supports high data rates. The IEEE 1284 bus communication standards may be implemented in application specific integrated circuits or through circuits built of conventional logic chips. Essentially, the bus control module 340 selects bus interfaces 320 and 330 for a particular camera by enabling a 4–16 line decoder 355 (a type 4515B in the preferred embodiment). This decoder 355 activates the selected interface pair 320 and 330 as shown in FIGS. 4 and 5, thus enabling the output control for the buffer 331 in the alarm bus interface and the corresponding buffer in the camera identification bus interface 320. Thus data is impressed on the data bus 380, where it may be read by the computer 400.

When the buffer outputs are not enabled, they are tri-stated, and thus do not interfere with bus operations. The software means running on the computer polls the bus interfaces 320 and 330 by sequentially advancing an address counter according to the types of data stored in the system. In the preferred embodiment, only camera identification data and alarm condition data are stored, so two camera addresses are allocated for each camera, and the software means assumes that the next addresses are from the next camera in the sequence. The polling cycle repeats after all camera addresses are polled.

The switching means 370 comprises an array of relays (16 in the preferred embodiment) corresponding to the number of camera inputs. It receives commands from a decoder 350, such as a type 4514B, to select a particular video input for routing to the computer 400. The software means parses the camera identification data and alarm condition data and determines, according to preselected criteria, whether the current picture from that camera should be stored. If a picture is to be stored, the computer outputs an address to the data bus 380 which is decoded by the decoder 350. The decoded address line is used to activate one of the relays in the switching means 370, so that the selected video is routed to the computer to be digitized and stored. The switching is done by mechanical relays in the preferred embodiment because of the low distortion introduced by this method. However, electronic switching could be used.

An embodiment of the invention which allows control of one camera and sensor combination which is local to the processor is possible. FIGS. 2 and 5 show a decoder chip 390 connected directly to the bus and responsive to the address of a local camera, thus allowing commands to be sent by the computer 400 to a camera located near the processor 300 in the monitoring area.

FIG. 2 shows a diagram of the computer system 400 in the preferred embodiment, where a conventional personal computer running the Microsoft Windows 95 operating system is used. However, another type of computer running a different operating system could be used to perform the same functions in the same way to achieve the intended results of the invention. The computer means 400 in the preferred embodiment of the invention comprises a computer having a data port 410 to receive the data bus 380, a video digitizer 420, a mass storage device 450, such as a removable hard drive, and, optionally, a device 430 to communicate with a network, a telephone modem 440, and a printer port 460. Although it is not necessary that the computer 400 be connected to a network, it is a special object of the invention that it be possible to so connect the computer 400, so that digitized and stored pictures can be retrieved from computers remote from the computer 400 directly connected to the processor 300.

Figure 7:
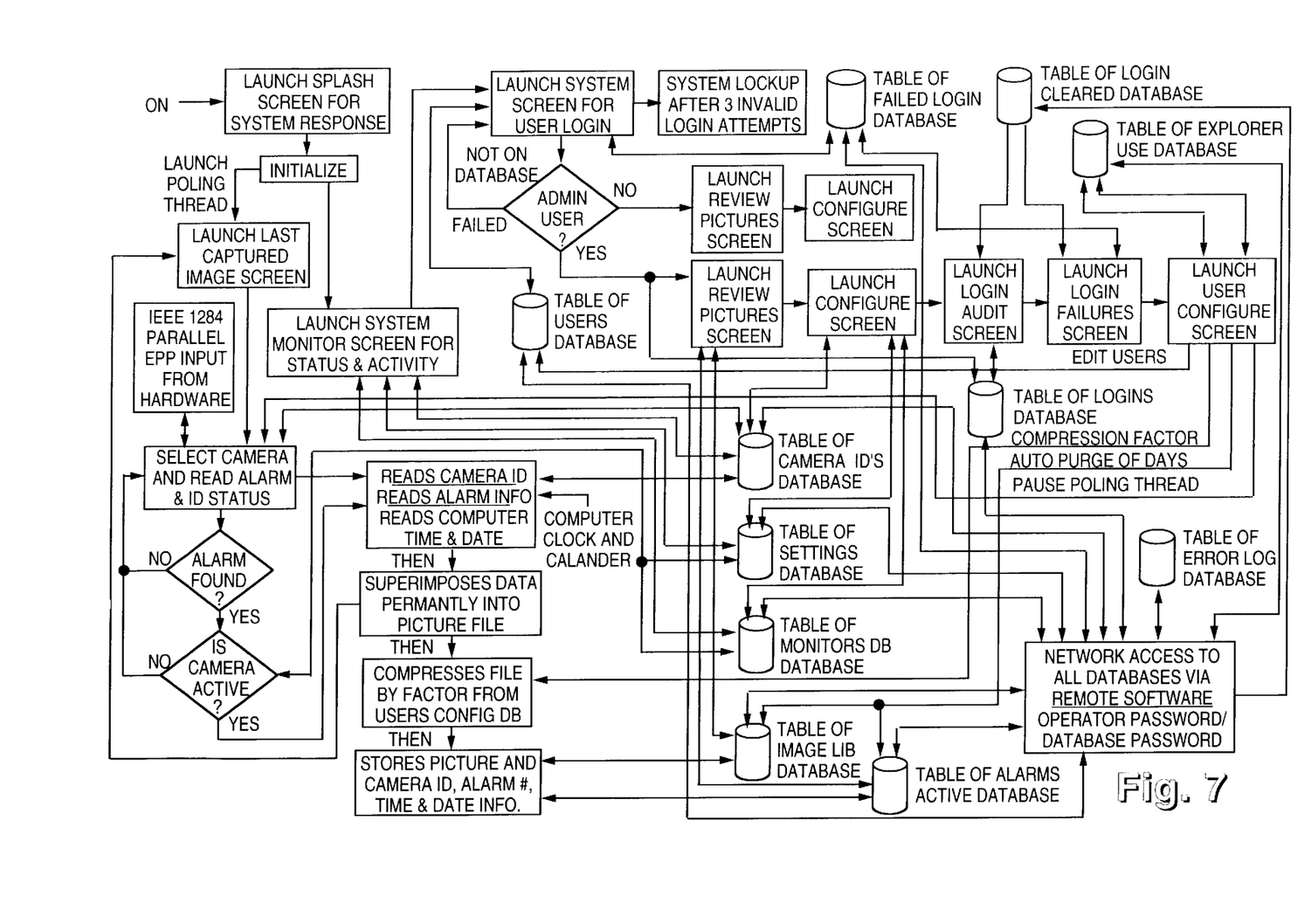
FIG. 7 is a flowchart diagram of the steps executed by the computer element of the preferred embodiment.

FIG. 7 shows a flow chart diagram of the control flow in the software running on the computer 400. In general, the computer software steps comprise polling the data bus to read the encoded data placed thereon, determining which of a plurality of video pictures having encoded data to digitize and store, selecting the video pictures having encoded data from one of the cameras to digitize and store, digitizing and storing the selected video pictures having encoded data in a database, transmitting control data to one or more cameras or sensors, according to predetermined criteria, and, retrieving stored video pictures having encoded data from the database.

FIG. 7 shows the primary control flow of the software running on the computer 400. However, FIG. 7 omits details of administrative functions which would be conventional to include in such software; these include a log-in session, screens to allow review of stored pictures according to predetermined criteria, a screen to allow user configuration of various parameters, and network access. It is important to note the step of selecting the next camera and reading the alarm status from that camera. This reading of status is done from the data bus 380 connected to the processor 300. Since data arriving from the camera encoders 200 has been previously decoded and latched, such latched data in the bus interfaces 320 and 330 may be read when the bus 380 is polled. Therefore, data from the cameras may arrive asynchronously and randomly and may be read without loss.

The foregoing detailed description shows only certain particular embodiments of the present invention. However, those skilled in the art will recognized that many modifications and variations may be made without departing substantially from the spirit and scope of the present invention. Accordingly, it should be clearly understood that the form of the invention described herein is exemplary only and is not intended as a limitation on the scope of the invention as defined in the following claims.

I claim:

1. An apparatus for selecting, storing and retrieving television camera video pictures generated asynchronously from a plurality of television cameras, comprising:
   a. a plurality of encoders, each encoder connected to a television camera for encoding alarm condition and camera identification data into the video picture vertical interval signals generated by each of the respective cameras encoder further including a first timing means for causing the encoding of alarm condition and camera identification data to take place in phase with respective predetermined horizontal lines of the video picture vertical interval signal of each camera;
   b. a means for transmitting the video pictures and data encoded therein to a processor, the processor further comprising:
      i. a plurality of decoders, each decoder responsive to signals from one camera, for decoding the data encoded in the video picture vertical interval signals of each of the respective camera into a parallel format,
      ii. a plurality of data registers connected to each decoder for storing data received from the decoder,
      iii. a timing means for updating the contents of the data registers, so that the register update operation takes place in phase with the writing and reading of data to the predetermined horizontal lines,
      iv. a data bus connected to the data registers,
      v. a computer connected to the data bus,
      vi. a switching means for sequentially poling, via the data bus, the stored contents of the data registers, extrapolated from video pictures and data encoded therein, transmitted from a plurality of cameras, responsive to commands from the computer, and,
      vii. a means for transmitting selected video pictures and data encoded therein from the switching means to the computer;
   c. the computer further comprising:
      i. a means for reading and writing data from selected data registers connected to the data bus,
      ii. a software means for detecting the occurrence of pre-determined conditions originating at one or more of the cameras,
      iii. a software means for selecting video pictures to digitize and store, responsive to the occurrence of predetermined conditions originating at one or more of the cameras,
iv. a software means for generating commands for the switching means,
v. a means for digitizing selected video pictures,
vi. a means for storing selected digitized video pictures in a database,
vii. a means for selectively retrieving and displaying stored digitized video pictures from the database.

2. The apparatus of claim 1 above where the first timing means includes a means for delaying past the video signal color burst the writing of data into the predetermined horizontal lines in the video picture vertical interval signal of each camera.

3. The apparatus of claim 1 above where the second timing means includes a means for delaying past the video signal color burst the reading of data from the predetermined horizontal lines in the video picture vertical interval signal of each camera.

4. The apparatus of claim 1 above further including a means for transmitting data from the computer to the processor for encoding data into the vertical interval signal for controlling one or more of the cameras or sensors.

* * * * *